United States Patent [19]

Cooke et al.

[11] 4,016,324
[45] Apr. 5, 1977

[54] SPANDREL GLASS PANEL

[75] Inventors: William C. Cooke; Albert H. Agett, both of Kingsport, Tenn.

[73] Assignee: ASG Industries, Inc., Kingsport, Tenn.

[22] Filed: July 19, 1974

[21] Appl. No.: 489,984

[52] U.S. Cl. .............................. 428/248; 428/433; 428/434; 428/457

[51] Int. Cl.² .................... B32B 7/00; B32B 23/00

[58] Field of Search ............. 161/88, 89, 192, 196, 161/207, 214, 231; 117/71 R; 428/426, 432, 207, 214, 480, 247, 248, 433, 434, 457; 52/307, 311, 622

[56] References Cited

UNITED STATES PATENTS

| | | | |
|---|---|---|---|
| 1,049,065 | 12/1912 | Eisele | 52/307 |
| 2,040,863 | 5/1936 | MacDonald et al. | 52/307 |
| 2,095,269 | 10/1937 | Schuler | 72/18 |
| 2,949,387 | 4/1960 | Colbert et al. | 161/207 X |
| 3,290,203 | 12/1966 | Antonson et al. | 161/192 X |
| 3,378,531 | 4/1968 | Heins et al. | 117/71 R X |
| 3,537,944 | 11/1970 | Grubb et al. | 117/71 R X |
| 3,558,422 | 1/1971 | Hamilton et al. | 161/192 X |
| 3,573,156 | 3/1971 | Reilly | 161/192 X |
| 3,694,337 | 9/1972 | Kushihashi | 161/196 X |
| 3,758,185 | 9/1973 | Gelber | 117/71 R X |
| R21,313 | 1/1940 | Desagnat | 52/307 |

Primary Examiner—Marion E. McCamish
Attorney, Agent, or Firm—Pennie & Edmonds

[57] ABSTRACT

A float or plate glass spandrel, preferably heat strengthened, coated with a thin film of metal has secured thereto on the metallic side thereof an insulation board. A barrier material such as a paint coating and a cotton muslin is interposed between the metallic coating and the insulation board to prevent "show through" of the insulation board and to insure adequate bonding.

10 Claims, 1 Drawing Figure

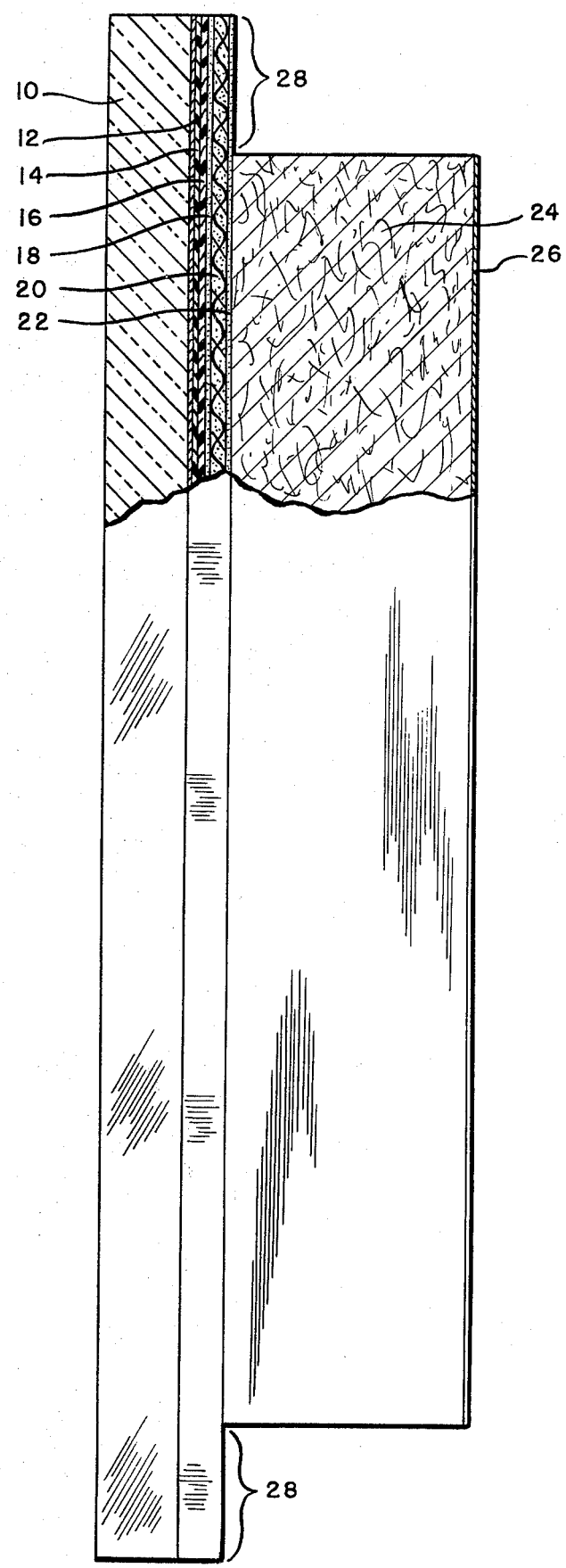

SPANDREL GLASS PANEL

BACKGROUND OF THE INVENTION

Glass spandrel panels have been used architecturally for many years as the outer surface of buildings between the floors, which must be opaque, and which must exhibit the same color as the windows of the floors both above and below when viewed in reflected light. For many years this was accomplished by use of ceramic colors fused to the inside surface of the glass sheet. For insulation purposes, an insulation board made from fiberglass, other fibrous materials, or sheets of polyurethane foam were fixed to the inner surface of the glass. Any number of adhesives can be used for securing these insulation boards to the colored enamel surface without adversely effecting the color as viewed in reflected light from the opposite side when installed.

More recently, however, these glass spandrels have utilized a metallic coating comprising a thin film of gold, aluminum, chromium or other metals applied to the inner surface of the glass in preference to the ceramic colors previously fused to the inside surface of the glass. These thin metallic films, as is well known, are applied by vacuum deposition or sputtering. These metallic films are extremely thin and fragile being on the order of from about 200 to 500 angstroms in thickness. They are transparent and transmit light and appear opaque in reflected light, as such, they are frequently used for solar control while providing a mirror-like metallic finish to the glass. Such glass spandrels are becoming widely used in insulated glass windows usually being assembled with a sheet of clear glass inside of and spaced from the metal film coated glass sheet with an air space therebetween and a suitable sealing component around the periphery of the two sheets of glass. When it is desired, as is usually the case, to retain the same color in the opaque areas of the building such as between floors as the colors in the windows in the floors above and below, it is necessary to provide for insulating the opaque panels in order to minimize heat loss. However, when attempts were made to bond the insulation board directly to the metallic coatings in a manner similar to that previously used with the fused ceramic colors, it was found that the fragile metallic coatings were easily penetrated by the fibers or surface texture of the insulation board. Further, these metallic films were so thin that they provided little if any hiding power and every spot of adhesive used to secure the insulation board could be seen through the glass. This "show through" was only one of the problems, for the solvents and other ingredients in the adhesives tended to deleteriously effect the fragile metallic films by corrosion or other undesirable reaction.

Accordingly, in order to provide architectural structures with the same reflected color in the opaque areas of the building, as in the windowed areas of the building, it was necessary to support the insulation board independently behind the metallic coated glass by means of a separate frame and air space, or alternately, to substitute a piece of metallic sheet metal for the sheet of clear glass used in the sealed window units. Both of these alternatives are exceedingly expensive.

BRIEF DESCRIPTION OF THE INVENTION

It has been found that by the use of a suitable barrier between the thin metallic coating of the glass spandrel and the insulation board it is possible to secure the insulation board to the glass spandrel into a single unit thus achieving for metallic coated spandrel glass the one piece construction previously obtainable only with the fused ceramic colors in glass sheets. The barrier must be opaque and must not adversely effect the metallic films as well as being such as to prevent "show through" of the surface of the insulation board of the fiber textures thereof.

PREFERRED EMBODIMENT

The unitary metal film coated glass spandrel with insulation board panel of this invention is shown in the single FIGURE of the drawings in which a quarter inch plate glass sheet 10 has previously applied thereto a thin metal film 12. As indicated above, the techniques for applying such films by various deposition methods such as sputtering are very well known and need not be further detailed here. The metallic film 12 may be any one of several metals such as gold, chromium, aluminum and alloys thereof, and is generally applied to a thickness of about 200 to 500 angstroms which provides a light transmission value of about 10% – 20%. Such units comprising a ¼ inch plate glass, preferably heat-treated to strengthen and temper the glass, having metallic films 12 thereon are commercially available.

It will be understood that the cross-section of the spandrel as shown in the drawing is greatly enlarged to more readily show the various thin films and coatings. Further, the relative thicknesses of the glass and films is not shown since the drawing is not to scale. For drafting convenience, the several discrete layers are shown in cross-section only at the top of the drawing though it will be appreciated that the layers extend over the entire surface of adjacent layers.

In order to provide a barrier material and insure opaqueness, the metal film is coated with at least one coat of paint 14. The presently preferred coating 14 is a high temperature lacquer that is white in color and classified as an alkyd based, silicone modified, heat-resisting lacquer. This material contains nothing that is reactive with the thin metallic film. A number of such lacquers are available including one sold under the tradename Nubelon Enamel — AGL-3815— produced by the Glidden Company. In order to thoroughly hide the generally stippled surface of the insulation board from any possible "show through", it is preferred to apply a second coat of paint 16. This second coat of paint 16 is also white, is preferably an acrylic latex paint, and is applied only after the first coating 14 is thoroughly dry. After drying of this second coat of paint 16, the glass sheet is placed upon a suitable work table with the painted surface up and a generous layer of adhesive applied using any suitable technique including a paint roller. This adhesive 18 may be any of a variety of suitable adhesives with a non-flammable, non-toxic white polyvinyl acetate co-polymer sold under the name "Bonsal Concrete Bonding Adhesive" by the W. R. Bonsal Company of Conley, Georgia being presently preferred.

After application of the adhesive 18, a piece of pre-cut cotton muslin cloth 20 is stretched thereover and brought into contact with the adhesive and smoothed out to eliminate air pockets or wrinkles. The preferred cloth is an unbleached cotton muslin cloth having 78 × 78 threads per inch, a weight of 3.40 yards per lb. and being 48 inches wide.

After applying the cotton muslin 20, an additional layer 22 of the same adhesive is applied immediately to the cloth and then a pre-cut sheet of insulation board 24 is carefully centered over the panel and secured in place with a light pressure usually being necessary since this insulation board panel tends to be curved or bowed. While a number of fibrous insulation boards are available as well as insulation boards of polyurethane foam, one preferred such board is a resin bound fiberglass board, commonly used in the industry, which is available with a thin aluminum foil backing 26. As shown in the drawings there is a ¾ inch recess 28 around the periphery of the insulation board 24 to permit glazing in certain applications. In other applications the insulation board 24 and its associated aluminum foil backing 26 may extend to flush with the periphery of the glass sheet 10.

As panels are completed they may be stacked one on top of the other in stacks up to about 40 panels deep for drying. The panels average generally 60 inches × 66 inches in size but may vary and may be any size up to 70 inches × 108 inches. For wide panels, the cotton muslin barrier 20 may not be wide enough, in which case, two sheets of cloth 20 may be used with an overlap joint ¾ inch in width at their juncture.

The heat-resistant coating 14 may be applied in any known manner preferably with a spray gun and will result in a coating after drying of about 0.001 inch in thickness. It is an elastic film and when heated softens but does not become tacky and it bonds well to the thin metal film 12 without damage thereto. Because of the elasticity of this coating 14 there is no cracking which otherwise might occur due to differences in thermal expansion of the coating and the metal film. This is important since the surface of the insulated spandrel frequently reaches temperatures of 160° – 170° F depending upon the location of the building. Additionally, shadows across the building provide uneven thermal zones and attendant stresses. For this reason, too, heat strengthened glass is preferred.

The acrylic latex coating paint 16 may be applied in any one of a number ways including spraying, rollers, and the like, but it is preferred to use a heavy felt paint roller. The thickness of this coating is 0.005 inch after drying. This coating 16 not only increases the thickness of the barrier but also provides a firmer base for the adhesive and the cloth portion 20 of the barrier than would be provided by the softer and more elastic heat-resistant lacquer of the coating 14. The cotton muslin cloth above mentioned is 0.0085 inch in thickness and serves well to prevent any "show through" of the fibers or stippled surface of the insulation board and prevents the same from penetrating the thin metallic film. The aluminum foil backing 26 is available in different thickness but is commonly used at a thickness of 0.025 inch. The fiberglass insulation board 24 is generally of 1 inch in thickness. Tests of the "U" value of the composite glass spandrel panel with a gold metal coating having a light transmission value of 10% and 1 inch fiberglass insulation as above described show a "U" value of 0.17. This may be compared with an insulated window also having a sheet of ¼ inch glass with the same gold metal coating but with a ½ inch air space and a second ¼ inch clear glass spaced therefrom with the periphery of the two glass sheets being sealed. Such an insulated window has a "U" value of 0.5.

While the preferred embodiment described utilizes a barrier made up of paint coatings and cotton muslin cloth to insure opaqueness when viewed from the outside and to prevent any "show through" of the fibers or pattern of an insulation board, (as well as to prevent damage to the metal film by the fibers of the insulation board) it will be appreciated that other barrier materials may also be utilized. Other cloth materials, and other materials including paper have been found to obscure the stippled surface of the insulation board, although, they did exhibit certain disadvantages which may or may not be important depending upon the application and quality desired.

We claim:
1. A spandrel panel comprising:
   a. a sheet of glass;
   b. a semi-transparent metallic film coating on one face of said sheet of glass;
   c. barrier means secured to said metallic film coating for preventing show through when the panel is viewed from the side thereof opposite to said metallic film coating;
   d. a sheet of insulation adhered directly to said barrier means; and
   e. said barrier means including:
      1. at least one elastic, heat resistant paint coating applied directly to said metallic film coating,
      2. a layer of cloth material adhered to said paint coating, and
      3. a second paint coating applied between the first mentioned, elastic paint coating and the cloth, said second paint coating being different from, less elastic than and less soft than the first mentioned coating.
2. The spandrel panel of claim 1 further including:
   a. an adhesive coating adhered between said second paint coating and said sheet of insulation and having said layer of cloth material embedded therein.
3. The spandrel panel of claim 1 in which:
   a. the first mentioned elastic paint coating is a white alkyl alkyd based, silicone modified, heat resistant lacquer and has a thickness of about 0.001 inch.
4. The spandrel panel of claim 3 in which:
   a. the second paint coating is a white acrylic latex and has a thickness of about 0.005 inch.
5. The spandrel panel of claim 4 in which:
   a. the metallic film coating has a thickness of about 200 to 500 angstroms.
6. The spandrel panel of claim 4 in which:
   a. the cloth material is a cotton muslin having a thickness of about 0.0085 inch.
7. A spandrel panel comprising a sheet of glass, a semi-transparent metallic film coating on one face of said sheet of glass, barrier means secured to said metallic film, a sheet of insulation secured to said barrier means, and said barrier means being effective to prevent damage to said metallic film by said sheet of insulation and is also effective to prevent show through of said sheet of insulation when the assembled panel is viewed form the side thereof opposite to said metallic film, said barrier means includes at least one paint coating applied to said metallic film and a layer of cotton muslin adhered to said paint coating, said paint is an elastic and heat resistant lacquer, said barrier means further includes at least one additional paint coating between said heat resistant lacquer and said layer of cotton muslin, and said additional paint layer is different from said heat resistant lacquer and is less elastic and less soft than said heat resistant lacquer.

8. A spandrel panel comprising a sheet of glass, a semi-transparent metallic film coating on one face of said sheet of glass, barrier means secured to said metallic film, a sheet of insulation secured to said barrier means, and said barrier means being effective to prevent damage to said metallic film by said sheet of insulation and for ensuring an adequate bonding of said sheet of insulation to said sheet of glass and metallic film, and for preventing show through of adhesive, said barrier means is also effective to prevent show through of said sheet of insulation when the assembled panel is viewed from the side thereof opposite to said metallic film, said barrier means includes at least one elastic paint coating which is a heat resistant lacquer applied to said metallic film and a layer of cloth adhered to said paint coating, said barrier means includes at least one additional paint coating between said heat resistant lacquer and said layer of cloth, said additional paint coating being different from said heat resistant lacquer and less elastic and less soft than said heat resistant lacquer.

9. A spandrel panel comprising a sheet of glass, a semi-transparent metallic film coating on one face of said sheet of glass, barrier means secured to said metallic film, a sheet of insulation secured to said barrier means, and said barrier means being effective to prevent damage to said metallic film by said sheet of insulation and for ensuring an adequate bonding of said sheet of insulation to said sheet of glass and metallic film, and for preventing show through of adhesive, said barrier means is also effective to prevent show through of said sheet of insulation when the assembled panel is viewed from the side thereof opposite to said metallic film, said barrier means includes at least one elastic paint coating which is a heat resistant lacquer applied to said metallic film and a layer of cotton muslin cloth adhered to said paint coating, said barrier means includes at least one additional paint coating between said heat resistant lacquer and said layer of cotton muslin, said additional paint layer is different from said heat resistant lacquer and is less elastic and less soft than said heat resistant lacquer.

10. A spandrel panel comprising:
a. a sheet of glass;
b. a semi-transparent metallic film coating on one face of said sheet of glass;
c. barrier means secured to said metallic film coating for preventing show through when the panel is viewed from the side thereof opposite to said metallic film coating, said barrier means including:
   1. at least one elastic, heat resistant paint coating, containing nothing reactive with said metallic film coating, applied directly to said metallic film coating, and
   2. a layer of cloth material adhered to said paint coating; and
d. a sheet of insulation adhered directly to said barrier means.

* * * * *